US010203957B2

United States Patent
Fei (10) Patent No.: US 10,203,957 B2
(45) Date of Patent: Feb. 12, 2019

(54) PROCESSOR WITH IMPROVED ALIAS QUEUE AND STORE COLLISION DETECTION TO REDUCE MEMORY VIOLATIONS AND LOAD REPLAYS

(71) Applicant: VIA ALLIANCE SEMICONDUCTOR CO., LTD., Shanghai (CN)

(72) Inventor: Xiaolong Fei, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 130 days.

(21) Appl. No.: 15/281,644

(22) Filed: Sep. 30, 2016

(65) Prior Publication Data

US 2018/0081688 A1  Mar. 22, 2018

(30) Foreign Application Priority Data

Sep. 18, 2016  (CN) .......................... 2016 1 0828147

(51) Int. Cl.
*G06F 9/312* (2018.01)
*G06F 9/54* (2006.01)
(Continued)

(52) U.S. Cl.
CPC ........ *G06F 9/30043* (2013.01); *G06F 9/3838* (2013.01); *G06F 9/3824* (2013.01);
(Continued)

(58) Field of Classification Search
CPC .. G06F 9/30043; G06F 9/3836; G06F 9/3838; G06F 9/3004; G06F 9/3824; G06F 9/3826; G06F 9/3828; G06F 9/383; G06F 9/3832; G06F 9/3834; G06F 9/3855; G06F 9/3857; G06F 9/3859
(Continued)

(56) References Cited

U.S. PATENT DOCUMENTS

2010/0306507 A1* 12/2010 Day ...................... G06F 9/3834
712/216
2013/0298127 A1* 11/2013 Meier ................... G06F 9/3834
718/100
(Continued)

FOREIGN PATENT DOCUMENTS

CN           103455309 A     12/2013

*Primary Examiner* — Daniel H Pan
(74) *Attorney, Agent, or Firm* — McClure, Qualey & Rodack, LLP (57) ABSTRACT

A register alias table for a processor including an alias queue, load and store comparators, and dependency logic. Each entry of the alias queue stores instruction pointers of a pair of colliding load and store instructions that caused a memory violation and a valid value. The store comparator compares the instruction pointer of a subsequent store instruction with those stored in the alias queue, and if a match occurs, indicates that a store index of the subsequent store instruction is valid. The load comparator determines whether the instruction pointer of a subsequent load instruction matches an instruction pointer stored in the alias queue. If so, dependency logic provides a store index, if valid, as dependency information for the subsequent load instruction.

20 Claims, 5 Drawing Sheets

(51) Int. Cl.
*G06F 9/30* (2018.01)
*G06F 9/38* (2018.01)

(52) U.S. Cl.
CPC .......... *G06F 9/3826* (2013.01); *G06F 9/3828* (2013.01); *G06F 9/3832* (2013.01); *G06F 9/3834* (2013.01); *G06F 9/3836* (2013.01); *G06F 9/3855* (2013.01); *G06F 9/3857* (2013.01); *G06F 9/3859* (2013.01)

(58) Field of Classification Search
USPC .................................................. 712/216–219
See application file for complete search history.

(56) References Cited

U.S. PATENT DOCUMENTS

| | | | | |
|---|---|---|---|---|
| 2014/0244984 | A1* | 8/2014 | Kaplan | ................. G06F 9/3834 712/225 |
| 2014/0281408 | A1* | 9/2014 | Zeng | ................... G06F 9/30043 712/216 |

* cited by examiner

PROCESSOR WITH IMPROVED ALIAS QUEUE AND STORE COLLISION DETECTION TO REDUCE MEMORY VIOLATIONS AND LOAD REPLAYS

BACKGROUND OF THE INVENTION

Field of the Invention

The present invention relates in general to determining and reducing store collisions in a processor, and more particularly to determining store collisions using an alias queue that stores load and store instruction pointers used to more accurately predict store collisions in order to reduce memory violations and load instruction replays.

Description of the Related Art

An out-of-order (OOO) processor allows instructions to be dispatched for speculative execution in a different order than dictated by software or program code. A load instruction, for example, may be dispatched for execution before a prior store instruction even though the load instruction needs data stored by the store instruction. Such speculative execution of the load instruction causes a memory violation requiring the load instruction to be replayed. The replay of instructions is costly in terms of processing efficiency, so that it is desired to detect subsequent iterations of the colliding load/store instruction pair and prevent additional load instruction replays.

SUMMARY OF THE INVENTION

A register alias table for a processor according to one embodiment includes an alias queue, load and store comparators, and dependency logic. Each entry of the alias queue stores instruction pointers of a pair of colliding load and store instructions that caused a memory violation and a valid value. The store comparator compares the instruction pointer of a subsequent store instruction with those stored in the alias queue, and when a match is detected, sets true the valid value in the corresponding alias queue entry. The load comparator determines whether the instruction pointer of a subsequent load instruction matches an instruction pointer stored in the alias queue. If so, dependency logic provides a store index of the subsequent store instruction, if indicated as valid by the valid value, as dependency information for the subsequent load instruction.

The register alias table may include a local memory that stores ROB indexes of the pair of load and store instructions that previously collided with each other causing the memory violation. The register alias table may further include RAT logic that compares a subsequent store index of a retiring store instruction with the store index stored in the local memory, and that retrieves and stores the store instruction pointer in the event of a match. The RAT logic may further compare a subsequent load index of a load instruction being replayed with the load index stored in the local memory, and in the event of a match, retrieves the load instruction pointer, allocates an entry in the alias queue, and stores the load and store instruction pointers into the allocated entry of the alias queue.

A processor according to one embodiment includes a reorder buffer and a register alias table. The reorder buffer includes a ROB queue with multiple entries in which each entry stores an instruction pointer of a corresponding instruction issued for execution. The register alias table includes an alias queue, RAT logic, load and store comparators, and dependency logic. The RAT logic receives a memory violation indication caused by a store collision between a prior load instruction and a prior store instruction. In response to the memory violation indication, the RAT logic retrieves from the ROB queue a store instruction pointer of the prior store instruction and a load instruction pointer of the prior load instruction and stores the instruction pointers into an entry of the alias queue. The store comparator compares a store instruction pointer of a subsequent store instruction with each store instruction pointer stored in the alias queue, and sets true a corresponding valid value in a corresponding alias queue entry when a match is detected. The load comparator compares a load instruction pointer of a subsequent load instruction with each load instruction pointer stored in the alias queue, and sets true an AQ hit when a match is detected with a stored load instruction pointer in the corresponding alias queue entry. The dependency logic provides a store index of the subsequent store instruction as dependency information for the subsequent load instruction when the valid value of the matching alias queue entry and the AQ hit are both true.

The reorder buffer of the processor may further include ROB logic that retires instructions in the ROB queue in program order and that identifies instructions being retired or replayed to the RAT logic. The RAT logic retrieves the store instruction pointer of the prior store instruction from the ROB queue upon retirement of the prior store instruction, and retrieves the load instruction pointer of the prior load instruction from the ROB queue upon replay of the prior load instruction. The register alias table may further include a local memory that stores ROB indexes of the colliding load and store instructions to detect retirement and/or replay of the load and store instructions. The processor may include a memory subsystem that detects a memory violation caused by a collision between the prior load and store instructions and that provides the memory violation indication identifying the prior load and store instructions to the reorder buffer and/or the register alias table.

A method of predicting load and store dependency to reduce memory violations according to one embodiment includes storing instruction pointers of colliding load and store instructions into an alias queue, comparing a subsequent store instruction pointer of a subsequent store instruction with each store instruction pointer stored in the alias queue, and when a match is found, indicating that a corresponding store index of the subsequent store instruction is valid, and comparing a subsequent load instruction pointer of a subsequent load instruction with each load instruction pointer stored in the alias queue, and when a match is found and if the corresponding store index of the subsequent store instruction is valid, providing the store index as dependency information for the subsequent load instruction.

The method may include receiving a memory violation indication that identifies the colliding load and store instructions, storing a load index that identifies the colliding load instruction and storing a store index that identifies the colliding store instruction, and when the colliding store instruction retires, retrieving and storing a corresponding store instruction pointer. The method may include storing a load index and a store index into a local memory, and retrieving the corresponding store instruction pointer from a ROB queue and storing into the local memory upon retirement of the store instruction. The method may include retrieving and storing a corresponding load instruction pointer upon replay of the colliding load instruction. The method may include allocating an entry in the alias queue, and storing the retrieved load instruction pointer into the entry of the alias queue and storing the corresponding store instruction pointer stored in the local memory into the entry of the alias queue.

BRIEF DESCRIPTION OF THE DRAWINGS

The benefits, features, and advantages of the present invention will become better understood with regard to the following description, and accompanying drawings where.

DETAILED DESCRIPTION

The inventor has recognized the deficiency of the conventional processor configuration for detecting and resolving memory violations caused by a collision between a load (LD) instruction and a store (ST) instruction, otherwise referred to herein as a store collision. An out-of-order (OOO) processor allows instructions to be dispatched for speculative execution in a different order than dictated by software or program code. In the event of a memory violation caused by a collision, a distance between the load/store colliding instruction pair is determined for detecting subsequent iterations of the same instruction pair. Many processors, however, support a fuse feature that merges multiple instructions into a reduced number of instructions (or even a single instruction) thereby potentially changing the distance between the load and store instructions of the colliding instruction pair.

The inventor has therefore also developed a processor with another alias queue and store collision detection mechanism that more accurately detects the load/store colliding instruction pair to reduce memory violations and load replays. Rather than relying on a distance between the load and store instructions that caused a memory violation, the instruction pointers of the colliding pair are stored and compared with subsequent iterations of the same pair of instructions. When a subsequent iteration of the store instruction is detected based on its instruction pointer, the register alias table indicates that a colliding subsequent store instruction is detected, and further captures and stores the reorder buffer (ROB) index assigned to the store instruction. When a subsequent iteration of the load instruction is detected based on its instruction pointer, the ROB index of the subsequent store instruction is retrieved and provided as dependency information for the subsequent load instruction.

In this manner, detection of the load/store collision pair is based on the actual determination of the ROB index of the store instruction in the current iteration rather than a potentially inaccurate distance determination.

Figure 1:
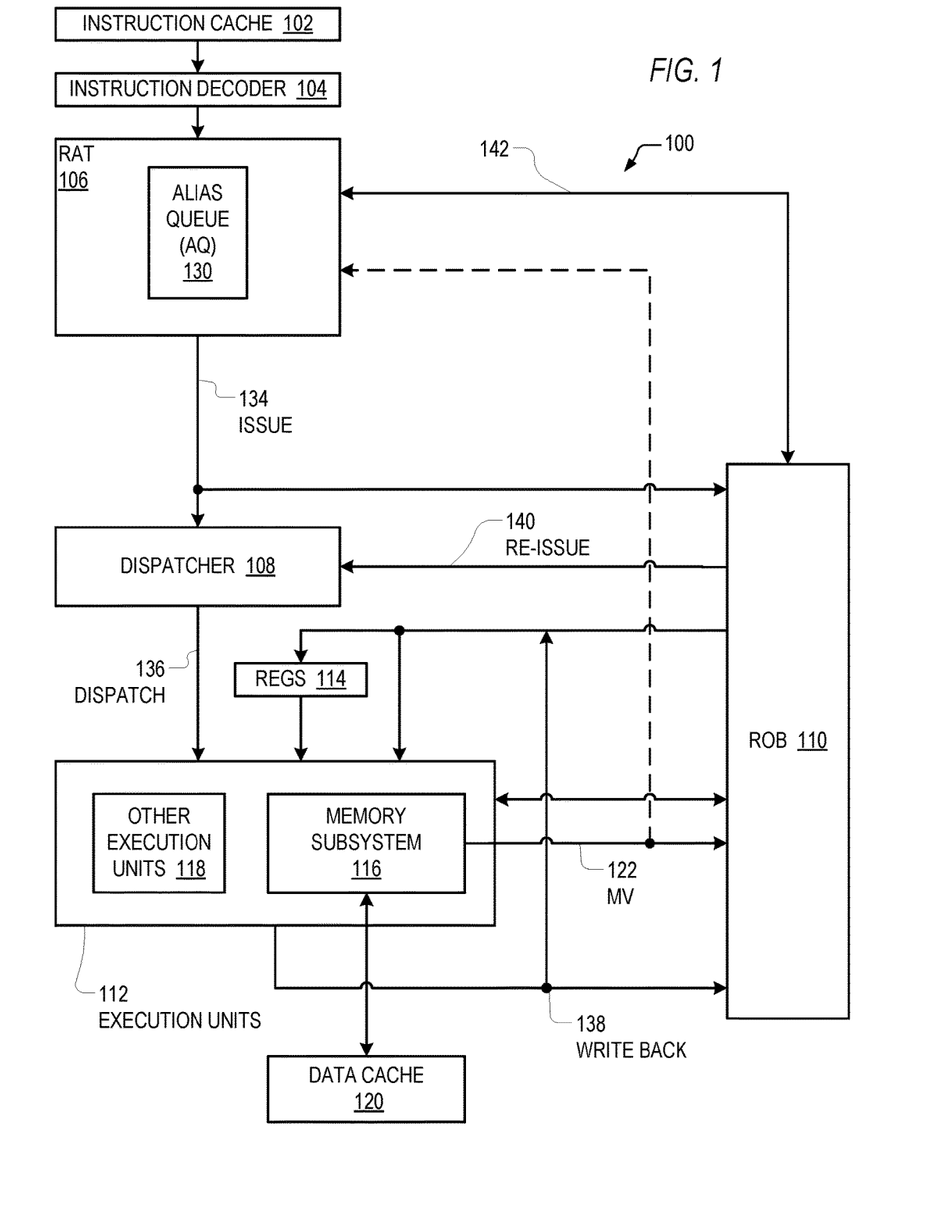
FIG. 1 is a block diagram illustrating a processor implemented according to an embodiment of the present invention with improved collision detection to reduce memory violations and load instruction replays.

FIG. 1 is a block diagram illustrating a processor 100 implemented according to an embodiment of the present invention with improved collision detection to reduce memory violations and load instruction replays. In one embodiment, the macroarchitecture of the processor 100 is an x86 macroarchitecture. A processor has an x86 macroarchitecture if it can correctly execute a majority of the application programs that are designed to be executed on an x86 processor. An application program is correctly executed if its expected results are obtained. In particular, the processor 100 executes instructions of the x86 instruction set and includes the x86 user-visible register set. However, the memory violation replay reduction mechanisms described herein may be employed in processors of other architectures, both existing and future. The term "processor" as used herein refers to any type of processing unit, including a microprocessor, a central processing unit (CPU), a processing core, a microcontroller, etc. The term "processor" as used herein also includes any type of processor configuration, such as processing units integrated on a chip or integrated circuit (IC) including those incorporated within a system of a chip (SOC) or the like.

The processor 100 includes an instruction cache 102 that caches program instructions from a system memory (not shown). The processor 100 also includes an instruction decoder 104 that receives instructions from the instruction cache 102 and decodes them. In one embodiment, the instruction decoder 104 includes an instruction translator that translates macroinstructions of a macroinstruction set of the processor 100 (such as the x86 instruction set architecture) into microinstructions of a microinstruction set architecture of the processor 100. In particular, the instruction decoder 104 translates memory access instructions, such as x86 MOV, PUSH, POP, CALL, RET, etc. instructions into a sequence of microinstructions that includes one or more load or store microinstructions, which are simply referred to herein as load instructions or store instructions. In other embodiments, the load and store instructions are part of the native instruction set of the processor 100.

The processor 100 also includes a register alias table (RAT) 106 coupled to the instruction decoder 104; a dispatcher 108 (otherwise known as reservation stations) coupled to the RAT 106; a reorder buffer (ROB) 110 coupled to the RAT 106 and to the dispatcher 108; execution units 112 coupled to the dispatcher 108 and the ROB 110; and registers 114 coupled to the ROB 110 and to the execution units 112. The processor 100 is configured as an out-of-order (OOO) machine in which instructions may be dispatched for execution in a different order than the order received from the instruction decoder 104. OOO processing means that the instructions are often executed in a different order than originally specified by source code or a software program.

The execution units 110 include a memory subsystem 116 (also known as a memory order buffer, or MOB) which executes memory access instructions, generally referred to herein as load and store instructions. In particular, the memory subsystem 116 reads and writes data from and to a data cache 120 that is coupled to the memory subsystem 116 in response to load and store instructions. Additionally, the memory subsystem 116 corresponds with a bus interface unit (not shown) to read and write data from and to the system memory. The execution units 110 also include other execution units 118, such as integer execution units, floating point units, multimedia units, and the like, that execute non-memory access instructions.

Although the memory subsystem 116 may receive and execute load and store instructions out of program order with respect to each other, the memory subsystem 116 correctly resolves memory violations or collisions that may result from such out of order execution. That is, the memory subsystem 116 ensures that each load instruction receives the correct data, in particular, from the correct store instruction (or store instructions in the case that multiple store instructions supply the data specified by a single load instruction) in the case of a store collision. As an example, when a load instruction is executed out of order before a prior store instruction that is intended to provide data to the load instruction, the memory subsystem 116 detects that the load instruction has not received correct data from the store instruction. The memory violation caused by the store collision is usually detected by the memory subsystem 116 when executing the store instruction. When the memory subsystem 116 detects a memory violation, it provides memory violation (MV) information along a signal path 122 to the ROB 110 to request the ROB 110 to replay the load instruction to ensure that it receives the correct data from the store instruction. A processor as described herein, however, more accurately detects such store collisions in order to reduce the number of load instruction replays requested by the memory subsystem 116. The MV information may also be provided directly to the RAT 106 with an extension of the signal path 122 shown as a dashed line.

The RAT 106 receives the decoded instructions from the instruction decoder 104 in program order and determines the dependencies of each instruction on other unretired instructions in the processor 100. The RAT 106 stores register renaming information associated with each unretired instruction in the processor 100. The register renaming information incorporates the program order of the instructions. Additionally, the RAT 106 includes a complex state machine or the like that controls various actions of the processor 100 in response to the renaming information and its other inputs, as described herein.

The RAT 106 generates dependency information for each instruction based on its program order, on the operand sources it specifies, and on the renaming information. The dependency information includes an identifier for each input operand of the instruction, namely an identifier of the dependee instruction upon which the input operand depends, if any. In one embodiment, the identifier is an index into the ROB 110 (ROB index, or RIDX) that identifies an entry in the ROB 110 that stores the dependee instruction and status information related thereto. As described further herein, the RAT 106 includes an alias queue (AQ) 130 that is used to identify a previous store collision involving a load and store instruction pair, and to update dependency of the load instruction to prevent future store collisions caused by subsequent execution of the same load and store instructions. It is noted that the load/store instruction pair may be provided in a program loop (or within code that is executed multiple times by a looping mechanism or the like). The memory violation is detected in a first execution, and prevented in subsequent iterations of the same instructions.

The RAT 106 issues the decoded instructions and their associated dependency information to the dispatcher 108 via one or more issue paths 134. Multiple issue paths 134 may be used when the processor 100 issues multiple instructions in parallel at the same time or within the same clock cycle. Prior to issuing one or more instructions, the RAT 106 allocates an entry in the ROB 110 for each instruction, in which each entry in the ROB is identified or otherwise accessed by a corresponding ROB index. When an instruction is pushed into the dispatcher 108, a corresponding entry in the ROB 110 is allocated and updated with the instruction and corresponding information. Thus, the instructions are issued to the dispatcher 108 and allocated in program order into the ROB 110. The ROB 110 may be configured as a circular queue or the like with multiple entries, which enables the ROB 110 to guarantee that the instructions are retired in program order.

The dispatcher 108 includes one or more queues (depending upon the dispatcher configuration) that hold the instructions and dependency information received from the RAT 108. The dispatcher 108 also includes dispatch logic that dispatches the instructions from the queues to the execution units 112 via one or more dispatch paths 136 when they are ready to be executed. Multiple dispatch paths 136 may be used when the processor 100 dispatches multiple instructions in parallel at the same time or within the same clock cycle. An instruction is ready to be dispatched and executed when its known dependencies are resolved and when an appropriate one of the execution units 112 is available. An instruction dependency is resolved when the dependee instruction has executed such that its result is available to the dependent instruction, i.e., the result is available to one of the execution units 112 that executes the dependent instruction. The execution units 112 may receive the results of executed instructions via the registers 114, or directly from the execution units 112 themselves via one or more write back paths 138. The registers 114 may be implemented as a physical register file (PRF) including a set of physical registers each pointed to or otherwise identified by physical register indexes. An entry within the ROB 110 corresponding to the store instruction may store a corresponding physical register index identifying a physical register of the registers 114 for writing the results.

The memory subsystem 116 resolves, i.e., computes, load addresses for load instructions and resolves store addresses for store instructions using the source operands specified by the load and store instructions. The sources of the operands may be the registers 114, constants, and/or displacements specified by the instruction. The memory subsystem 116 also reads load data from the data cache 120 at the computed load address. The memory subsystem 116 also writes store data to the data cache 120 at the computed store address. In one embodiment, the memory subsystem 116 includes one or more load units that execute load instructions and one or more store units that execute store instructions.

As previously mentioned, the memory subsystem 116 detects a memory violation and provides MV information to the ROB 110 via signal path 122. In the event of a store collision, the MV information identifies the load instruction that must be replayed, so that the ROB 110 can update the indexed entry with an indication that the replay is needed. The MV information also identifies the store instruction with which the load instruction collided. In one embodiment, the load and store instructions are each identified by corresponding ROB indexes. In another embodiment, each instruction is identified by a corresponding instruction pointer (IP) identifying the location of the instruction within the system memory and/or the instruction cache 102. An IP is typically identified as a next sequential IP (NSIP) value or the like that is provided with each instruction as it is processed through the dispatcher 108, the ROB 110 and the execution units 112.

When the instruction whose ROB entry is marked as needing to be replayed is next to be retired, i.e., is the oldest unretired instruction, the ROB 110 replays the load instruction. The ROB 110 may re-issue the load instruction to the dispatcher 108 via one or more re-issue paths 140 to await subsequent re-dispatch to the execution units 112 and re-execution thereby. In one embodiment, the ROB 110 replays not only the load instruction, but also replays all instructions newer than the load instruction. When the ROB 110 replays the load instruction, the ROB 110 also signals this event to the RAT 106 via a corresponding replay signal via communication path 142 between the RAT 106 and the ROB 110. The replay signal identifies the load instruction being replayed, such as specifying the ROB index of the load instruction. As further described herein, the ROB 110 provides, or the RAT 106 retrieves, additional information to identify the memory violation to update the AQ 130. As described further herein, the RAT 106 updates the dependency information of the load instruction being replayed to reduce the replay incidents caused by similar memory violations.

Figure 2:
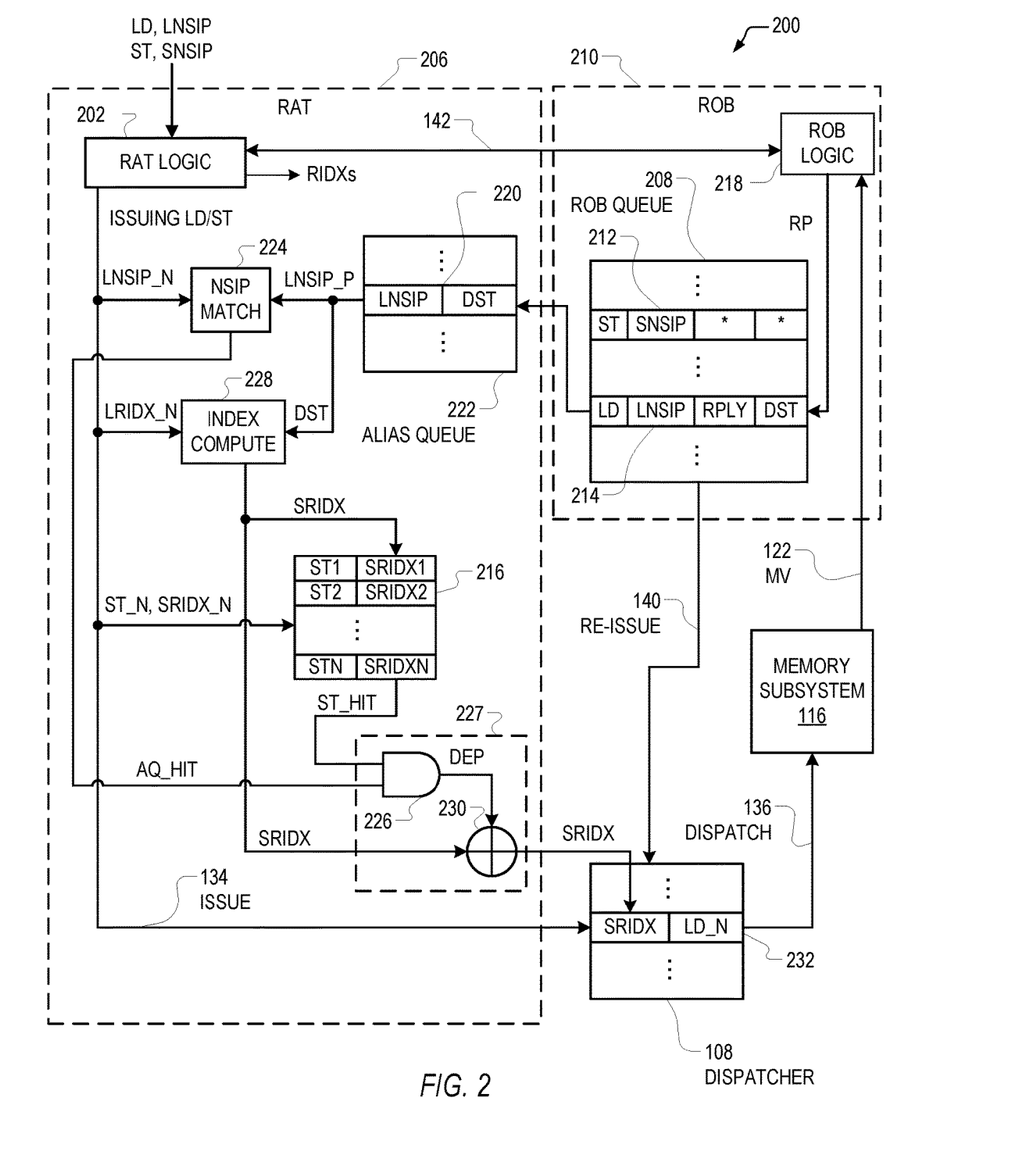
FIG. 2 is a block diagram of portions of a processor implemented according to one embodiment of the present invention for detecting and resolving memory violations caused by a store collision.

FIG. 2 is a block diagram of portions of a processor 200 implemented according to one embodiment of the present invention for detecting and resolving memory violations caused by a collision between a load (LD) instruction and a store (ST) instruction. The processor 200 includes a RAT 206 performing similar functions as the RAT 106 by resolving dependencies and issuing instructions, and a ROB 210 performing similar functions as the ROB 110 by re-issuing instructions and retiring instruction in program order. The dispatcher 108 and the memory subsystem 116 are included and coupled to the RAT 206 and the ROB 210 to operate in similar manner previously described. The RAT 206 includes RAT logic 202 that receives the instructions from the instruction decoder 104, including load (LD) instructions (including any of many different instruction types that load information from the data cache 120 and/or the system memory), and store (ST) instructions (including any of many different instruction types that store information to the data cache 120 and/or the system memory). An NSIP value is included with each instruction, shown as an LNSIP value for LD instructions and an SNSIP value for ST instructions. The RAT logic 202 resolves instruction dependencies and generates a ROB index (RIDX) for locating an allocated entry of a ROB queue 208 provided within the ROB 210 for each instruction. The instructions that are ready to be issued are provided to the dispatcher 108 along the issue paths 134 as previously described. A pair of entries 212 and 214 in the ROB queue 208 are allocated and updated for the ST and LD instructions, respectfully, when the corresponding ST and LD instructions are issued to the dispatcher 108. As shown, the entry 212 includes the SNSIP value for the ST instruction, and the entry 214 includes the LNSIP value for the LD instruction.

The RAT 206 includes a store list 216 that stores an entry for each store instruction that passes through the RAT 106 until it is retired. As shown, for example, each new store instruction, shown as ST_N, includes a corresponding ROB index SRIDX_N stored within the store list 216. The size of the store list 216 is arbitrary and is shown storing up to an integer number N store instructions, individually shown as ST1, ST2, . . . STN (ST1-STN). Each store instruction entered into the store list 216 includes a corresponding ROB index determined by the RAT logic 202, shown as SRIDX1, SRIDX2, . . . , SRIDXN (SRIDX1-SRIDXN) for the store instructions ST1-STN, respectively. When each store instruction is subsequently retired by the ROB 210, the corresponding entry in the store list 216 is invalided or emptied to receive a new store instruction.

The memory subsystem 116 is configured to detect memory violations including store collisions between LD and ST instructions. Although the ST instruction may occur first in program order to provide data to the LD instruction, OOO operation may allow the LD instruction to be executed first. When the ST instruction is executed, the memory subsystem 116 detects that the LD instruction did not receive correct data and provides corresponding memory violation (MV) information to the ROB 210 via the signal path 122 identifying the colliding load and store instructions. The MV information may include information identifying each of the colliding LD and ST instructions, such as the corresponding ROB indexes LRIDX and SRIDX or the corresponding NSIP values LNSIP and SNSIP. In one embodiment, the NSIP values are relatively large (e.g., 49 bits) whereas the ROB indexes are relatively small (e.g., 5 bits). A reduced version of the NSIP values may be used, such as lower page bits (e.g., 12 bits) and/or additional hashed versions of the upper bits. The reduced NSIP values, however, are still usually larger than the ROB indexes. The ROB indexes LRIDX and SRIDX are particularly useful for quickly identifying the corresponding entries 212 and 214 within the ROB queue 208 for the ST and LD instructions, respectively.

In one embodiment, the memory subsystem 116 may directly access the ROB queue 208 to indicate the store collision and to prevent subsequent memory violations. Alternatively, the MV information is provided to ROB logic 218 of the ROB 210, which accesses and updates the ROB queue 208. As shown, the entry 214 for the LD instruction includes a field to identify the load instruction LD, another field to store the NSIP value LNSIP, another field that stores a replay value RPLY, and another field that stores a distance value DST. Additional fields may be provided but are not shown. An asterisk "*" in a field denotes an empty or null value. In the event of a store collision between the LD and ST instructions, the RPLY value in the entry 214 for the LD instruction is updated or set to instruct the ROB 210 to replay the LD instruction. Furthermore, the "distance" between the LD and ST instructions is calculated and stored as the DST value in the entry 214. The DST value may simply be the difference between the ROB indexes SRIDX and LRIDX for the ST and LD instructions, respectively.

The ROB logic 218 further performs retire functions by generating a retire pointer RP that points to the oldest instruction within the ROB queue 208. When the oldest instruction pointed to by RP is ready to retire, the ROB logic 218 performs the functions necessary to retire the instruction and to remove it from the ROB queue 208. If, however, the RPLY value is set, such as is the case for the entry 214 of the LD instruction, the ROB logic 218 causes the LD instruction to be re-issued to the dispatcher 108 for re-execution. The LD instruction is not retired at this time, but remains within the ROB queue 208 until successfully re-executed by the memory subsystem 116 and ultimately retired. When the LD instruction is re-issued to be replayed, the ROB logic 218 also asserts the replay signal to the RAT 206 in which the replay signal further identifies LD as the load instruction being replayed. In the configuration of the processor 200, upon replay of the LD instruction, the corresponding LNSIP and DST values are copied from the entry 214 in the ROB queue 208 to an entry 220 of an alias queue (AQ) 222 of the RAT 206.

As new load instructions are being received and processed by the RAT logic 202, each LNSIP value for each new load instruction, shown as LNSIP_N, is provided to an input of an NSIP comparator 224 within the RAT 206. The NSIP comparator 224 compares LNSIP_N with each of the prior LNSIP values stored within the AQ 222, shown as LNSIP_P. When a match occurs, such as when the LNSIP_N equals an LNSIP_P from the AQ 222, the NSIP comparator 224 asserts true an AQ_HIT signal to one input of compare logic 226 of dependency logic 227. Also, for each new load instruction, the corresponding ROB index value, shown as LRIDX_N, is provided to one input of an index computation circuit 228, which receives the DST value of a matching entry within the AQ 222 at another input. The index computation circuit 228 determines the difference between LRIDX_N and DST to compute a corresponding ROB index, shown as SRIDX, of a potentially colliding store instruction. The computed SRIDX value is provided to the store list 216, and the store list 216 compares SRIDX with each of the stored ROB indexes SRIDX1-SRIDXN of corresponding store instructions currently being processed in the processor 200. In the event of a match, the store list 216 asserts a store hit value ST_HIT to another input of the compare logic 226. The compare logic 226 is shown as a Boolean logic AND gate, such that when ST_HIT and AQ_HIT are both true, the compare logic 226 asserts or otherwise sets true a dependency signal DEP to an input of pass logic 230 of the dependency logic 227. Meanwhile, the computed SRIDX value is provided to another input of the pass logic 230. When DEP is set true, the pass logic 230 passes the computed SRIDX value as dependency information along with the new load instruction passed via the issue paths 134 to the dispatcher 108.

The dispatcher 108 includes multiple entries for instructions that have been issued from the RAT 206. As shown, an entry 232 corresponds with a newly issued load instruction, shown as a microinstruction LD_N. The computed SRIDX value is provided within a field of the entry 232 indicating that the load instruction LD_N is dependent upon the store instruction identified by SRIDX. In particular, SRIDX is intended to be the ROB index of a store instruction within the ROB queue 208 upon which the load instruction LD_N depends. The dispatcher 108 uses this information to ensure that the load instruction LD_N is not dispatched before the store instruction upon which it depends so that the memory violation is not repeated for subsequent iterations of the same load/store instruction pair.

When the NSIP comparator 224 does not detect a match with LNSIP_N, then AQ_HIT is false so that DEP is false (or not asserted) and the computed SRIDX value is not passed by the pass logic 230 to the dispatcher 108 as the dependency information for the new load instruction. Also, even if AQ_HIT is true, if the store list 216 does not detect a match with the computed SRIDX, then the computed SRIDX is ignored and is not passed by the pass logic 230 to the dispatcher 108 as dependency information for the new load instruction. As described further herein, however, the DST value may not accurately reflect the distance between the colliding load and store instructions so that the computed SRIDX "misses" the correct store instruction stored within the store list 216. In this manner, even though a true colliding LD/ST instruction pair may exist, it may not be detected so that the load replay occurs again for the next iteration of the load/store instruction pair.

The configuration of the processor 200 is sufficient to identify store collisions when the "distance" between the store and load instructions of the load/store instruction pair is fixed. The instruction decoder 104, however, incorporates a fuse feature that merges multiple instructions into a single microinstruction or "μop." Consider the following instruction sequence in the code of a software program or the like:

```
MOV [EAX], EDX    (ST)
...
TEST EAX, EBX
JNE
...
MOV EBP, [EAX]    (LD)
```

The first move instruction (MOV) is generally a store instruction (ST) that moves the contents of a register EDX into a memory location in the system memory identified (e.g., using a memory pointer or memory address or the like) by the contents of another register EAX. The second move instruction is generally a load instruction (LD) that moves the contents of a memory location in the system memory identified by the contents of the EAX register into another register EBP. The intermediate TEST instruction compares the contents of the EAX and EBX registers and sets a corresponding flag or the like when the contents are equal to each other. The next JNE instruction instructs the processor to jump to another program location if the contents of the EAX and EBX registers are not equal. The intermediate ellipses " . . . " generally represent that any number of instructions (including 0 instructions) may be inserted between the listed instructions.

The instructions above are converted by the instruction decoder 104 into a series of microinstructions, or "μμops," in which there are a number of μμops between the ST instruction and the LD instruction. If the translation is exactly the same each time such that the number of μops does not vary, then the "distance" between the ST and LD instructions, determined as the DST value, is essentially fixed. The configuration of the processor 200 works well for detecting and reducing store collisions and corresponding load instruction replays when the distance between instructions remains substantially fixed. The TEST and JNE instructions, however, may be decoded into two μμops or they may be merged into a single μop using the fuse function during one or more iterations, so that the distance between ST and LD is not fixed. The fuse function may apply to many other combinations of code in a given code sequence or program. In general, the store collision detection mechanism using a distance determination does not handle the situation in which the fuse function or any similar types of functions causes decode variations resulting in variable distances between load and store instruction pairs. It is noted that the processor 200 may still operate correctly since the memory subsystem 116 detects memory violations and invokes replays to eventually ensure proper operation. The processing overall efficiency may, however, be significantly reduced.

Figure 3:
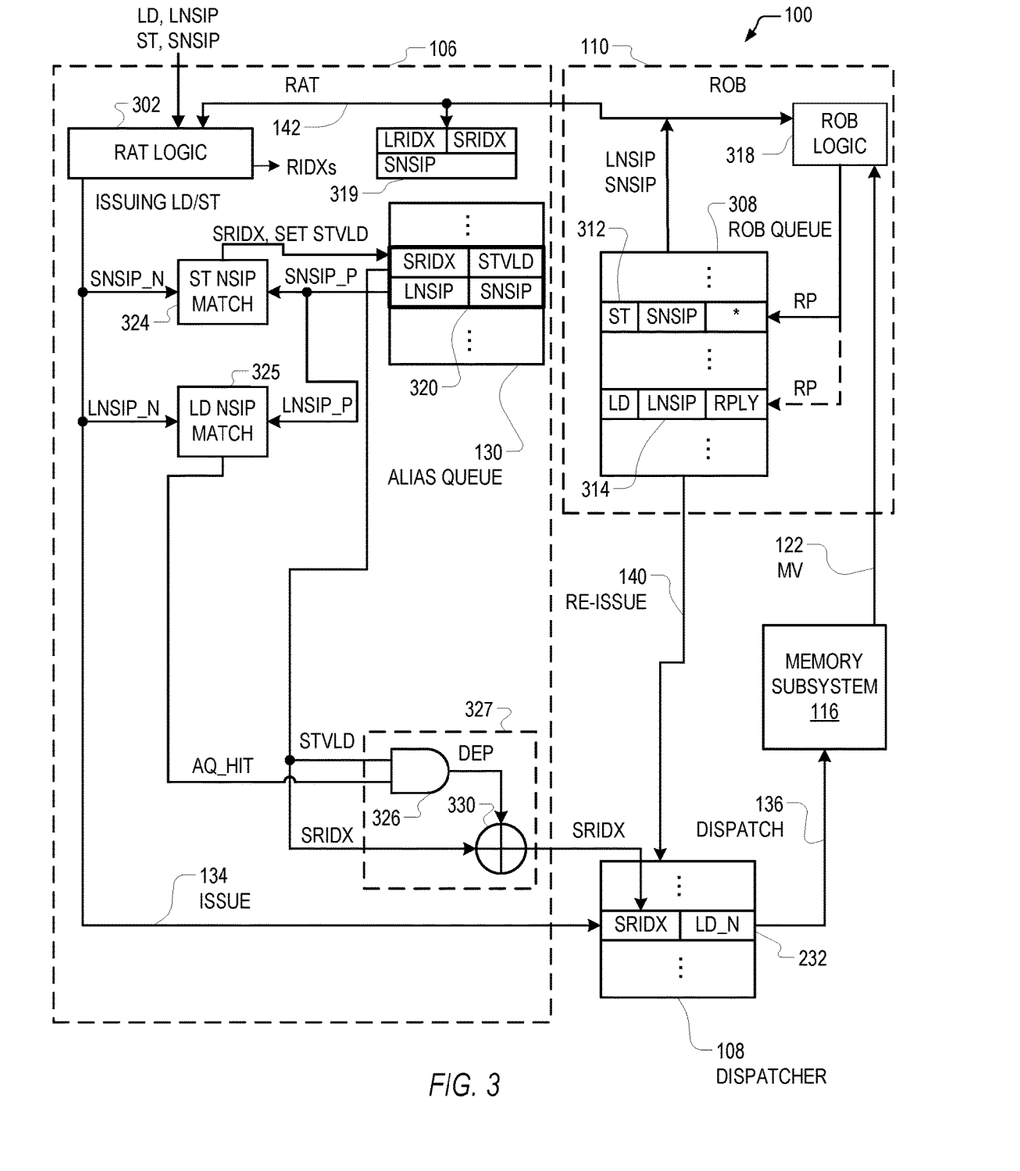
FIG. 3 is a block diagram of portions of the processor of FIG. 1 implemented according to another embodiment of the present invention for detecting and reducing memory violations caused by a store collision.

FIG. 3 is a block diagram of portions of the processor 100 implemented according to another embodiment of the present invention for detecting and reducing memory violations caused by a collision between a load (LD) instruction and a store (ST) instruction. The processor 100 supports the fuse feature in which multiple instructions may be merged into one microinstruction or at least a reduced number of microinstructions, such that the distance between potentially colliding load and store instructions may vary. The RAT 106 and the ROB 110 are shown in further detail coupled to the dispatcher 108 and the memory subsystem 116. The RAT 106 includes RAT logic 302 which receives the instructions from the instruction decoder 104, including LD instructions and ST instructions that further include LNSIP and SNSIP values, respectively. The RAT logic 302 resolves instruction dependencies and generates ROB indexes (RIDXs) for locating allocated entries of a ROB queue 308 provided within the ROB 110. In one embodiment, the ROB queue 308 includes 48 entries, although any other number of entries may be contemplated for different processor configurations. The instructions that are ready to be issued are provided to the dispatcher 108 along the issue paths 134 as previously described. A pair of entries 312 and 314 in the ROB queue 308 are updated for the ST and LD instructions, respectfully, when the corresponding ST and LD instructions are issued to the dispatcher 108. In a similar manner as previously described, the entry 312 includes the SNSIP value for the ST instruction, and the entry 314 includes the LNSIP value for the LD instruction.

The memory subsystem 116 operates as previously described in which it detects memory violations including store collisions between LD and ST instructions. As previously described, a store collision is usually detected when executing the store instruction in which the memory subsystem 116 detects that the previously executed load instruction did not receive correct data. The memory subsystem 116 provides corresponding MV information to the ROB 110 via the signal path 122 identifying the colliding load and store instructions. The colliding LD and ST instructions may be identified in similar manner, such as by providing ROB indexes or corresponding NSIP values or the like. The entries 312 and 314 of the ROB queue 308 are similar to the entries 212 and 214, respectively, including a field to identify the instruction, another field to store the NSIP value, and another field for storing the replay value RPLY. The field for storing the distance value DST, however, is not necessary and not included. Additional fields may be provided but are not shown. In the event of a store collision between the LD and ST instructions as indicated by the MV information, the memory subsystem 116 or the ROB logic 318 sets the RPLY value in the entry 314 for the LD instruction to instruct the ROB 110 to replay the LD instruction upon retirement.

The MV information may be provided directly to the RAT logic 302 of the RAT 106, such as by the communication path 122 (FIG. 1), in which the ROB indexes LRIDX and SRIDX of the load/store collision pair are provided to the RAT 106. In addition, or in the alternative, the ROB logic 318 reports the memory violation to the RAT logic 302 of the RAT 106 via the communication path 142 by reporting the load and store ROB indexes LRIDX and SRIDX of the load/store collision pair. In one embodiment, the RAT 106 includes a local memory 319 to enable the RAT logic 302 to store the ROB indexes LRIDX and SRIDX of the load/store collision pair for tracking the oldest store collision. In the event a subsequent memory violation is caused by an older store collision, meaning an older store instruction of the subsequent load/store collision pair, the local memory 319 is updated by the RAT logic 302 to reflect the oldest load/store collision pair.

In a similar manner as previously described for the ROB logic 218, the ROB logic 318 performs retire functions by generating the retire pointer RP that points to the oldest instruction within the ROB queue 308. When the oldest instruction pointed to by RP is ready to retire, the ROB logic 318 performs the functions necessary to retire the instruction and to remove it from the ROB queue 308. These functions include reporting to the RAT logic 302 of the RAT 106 the ROB index of the retiring instruction via the communication path 142. When RP points to the entry 312 to retire the store instruction of the load/store collision pair that caused the memory violation, the corresponding ROB index SRIDX is reported to the RAT logic 302. If the local memory 319 of the RAT 106 stores valid ROB indexes of a load/store collision pair that caused a memory violation, then the RAT logic 302 compares the SRIDX of the retiring store instruction with the SRIDX stored in the local memory 319. In the event of a match, the RAT logic 302 retrieves the corresponding NSIP value SNSIP of the retiring store instruction from the ROB queue 308 and stores SNSIP into the local memory 319. Since the store instruction has been executed properly, it is allowed to retire, and once retired the ROB entry is available to be updated with a newer instruction so that the stored SNSIP is not available after retirement of the store instruction. Thus, the SNSIP of the retiring store instruction is temporarily saved into the local memory 319.

When RP points to the entry 314 for the load instruction, the ROB logic 318 detects that the RPLY value is set, and causes the LD instruction to be re-issued to the dispatcher 108 for re-execution (otherwise referred to as replay). The LD instruction is not retired at this time, but remains within the ROB queue 308 until successfully re-executed by the memory subsystem 116 and ultimately retired. Nonetheless, the ROB 110 reports to the RAT logic 302 via the communication path 142 that the LD instruction is being replayed and identifies the ROB index LRIDX of the load instruction being replayed. The RAT logic 302 compares the LRIDX of the load instruction being replayed with the LRIDX stored in the local memory 319. In the event of a match between the LRIDX values, the RAT logic 302 allocates an entry 320 of the AQ 130 of the RAT 106, and then moves or copies the SNSIP value of the colliding store instruction from the local memory 319 into a field of the new entry 320. Furthermore, the RAT logic 302 uses the LRIDX value of the load instruction to retrieve the corresponding NSIP value LNSIP of the load instruction from the ROB queue 308 and stores LNSIP into another field of the entry 320 of the AQ 130.

Each entry of the AQ 130, including the entry 320, further includes a store valid field for storing a store valid value STVLD. Each entry of the AQ 130, including the entry 320, may further include a store ROB index field for storing a store ROB index SRIDX as shown in the illustrated embodiment. In another embodiment, the entries of the AQ 130 do not include the store ROB index field and instead the store ROB index SRIDX is stored in a separate memory location within the RAT 106. The store value field and store ROB index field (if included) of the entry 320 are not yet defined when the LNSIP and SNSIP values are transferred into the AQ 130 in response to replay of the colliding load instruction. It should be noted that the SRIDX from the local memory 319 is not stored since it was the ROB index value of a prior iteration of the store instruction and is no longer valid. Instead, a ROB index of a subsequent iteration of the store instruction is stored, either in the AQ 130 (e.g., entry 320) or other storage location as further described herein. It is worth noting that the AQ 130 may include multiple entries 320 to record multiple colliding load/store instruction pairs. A store ROB index field may be included with each entry. Alternatively, the store ROB index(es) SRIDX corresponding to each entry are stored in a separate memory location.

As subsequent (or new) store instructions are being received and processed by the RAT logic 302, each SNSIP value for each subsequent store instruction, shown as SNSIP_N, is provided to an input of an NSIP comparator 324 within the RAT 106. The NSIP comparator 324 is similar to the NSIP comparator 224, in which it compares SNSIP_N with each of the previous SNSIP values stored within the AQ 130, shown as SNSIP_P. When a match occurs, such as when the SNSIP_N equals SNSIP_P from entry 320 of the AQ 130, then this means that store instruction involved in a prior store collision is being re-executed in a subsequent iteration of the store instruction. In this case, the NSIP comparator 324 sets true the STVLD value in the entry 320 to indicate that the store instruction involved in a colliding load/store instruction pair in the entry 320 is now being re-executed. In one embodiment, where each entry 320 further includes the store ROB index field, the NSIP comparator 324 further copies the ROB index of the store instruction corresponding with SNSIP_N as the ROB index SRIDX into the store ROB index field of the entry 320.

As subsequent load instructions are being received and processed by the RAT logic 302, each LNSIP value for each subsequent load instruction, shown as LNSIP_N, is provided to an input of another NSIP comparator 325 within the RAT 106. The NSIP comparator 325 is similar to the NSIP comparator 224, in which it compares LNSIP_N with each of the previous LNSIP values stored within the AQ 130, shown as LNSIP_P. When a match occurs, such as when the LNSIP_N equals LNSIP_P from entry 320 of the AQ 130, then the NSIP comparator 325 sets true an AQ_HIT signal to one input of compare logic 326 of dependency logic 327. Furthermore, the corresponding STVLD value from the matching entry 320 is provided to another input of the compare logic 326. The compare logic 326 is shown as a Boolean logic AND gate, such that when STVLD and AQ_HIT are both true, the compare logic 326 asserts or otherwise sets true a dependency signal DEP to an input of pass logic 330 of the dependency logic 327. Meanwhile, the SRIDX value of the hitting store instruction corresponding to the store instruction pointer (NSIP values) SNSIP is provided to another input of the pass logic 330. The SRIDX value of the hitting store instruction is also stored in the store ROB entry field of the matching entry 320 (if provided as shown in the illustrated configuration), or is stored in another memory location of the RAT 106 in another embodiment. When DEP is set true, the pass logic 330 passes the retrieved SRIDX value as dependency value SRIDX along with the subsequent load instruction passed via the issue paths 134 to the dispatcher 108.

As before, the dispatcher 108 includes multiple entries for instructions that have been issued from the RAT 106. As shown, the entry 232 corresponds with a newly issued load instruction, shown as a microinstruction LD_N. The SRIDX value is provided within a field of the entry 232 indicating that the load instruction LD_N is dependent upon the store instruction identified by its corresponding ROB index SRIDX. The dispatcher 108 uses this information to ensure that the load instruction LD_N is not dispatched before the corresponding store instruction upon which it depends so that the memory violation is not repeated for subsequent iterations of the same load/store instruction pair.

As compared to the configuration of the processor 200, the store collision configuration shown in FIG. 3 performed by the processor 100 does not rely on the distance between the load and store instruction pair, which may be unreliable in many situations including when the fuse feature is supported. Instead, the store collision configuration uses instruction pointer information (NSIP values) to specifically identify both the load instruction and the store instruction of the load/store instruction pair that caused the memory violation that was originally detected by the memory subsystem 116. When an NSIP value of a subsequent store instruction matches an NSIP value stored in the AQ 130, the STVLD value, which indicates that the subsequent store instruction was involved in a prior store collision and now being detected in this iteration, is set valid, and meanwhile, the actual ROB index of the subsequent store instruction is stored, for example, in the matching entry of the AQ 130.

When an NSIP value of a subsequent load instruction matches an NSIP value stored in the AQ 130, then the ROB index of the corresponding store instruction is retrieved and used as the dependency information of the load instruction. In this manner, regardless of the number of intermediate μμops between the next iteration of the same colliding load/store instruction pair, the load instruction is correctly updated to depend upon the corresponding store instruction. The dispatcher 108 detects the dependency and does not dispatch the load instruction before the store instruction and the memory violation is avoided in subsequent iterations. Reducing the number of store collisions further reduces the number of load instruction replays to improve operation efficiency.

When the NSIP comparator 324 does not detect a match within the AQ 130, then this means that the subsequent store instruction either is not involved in a colliding load/store instruction pair, or that it is the first (or possibly only) iteration of the colliding load/store instruction pair. If a subsequent load instruction does, in fact, does depend upon the subsequent store instruction, and if the subsequent load instruction is then dispatched before the subsequent store instruction according to OOO operation, then the store collision is detected by the memory subsystem 116 and the AQ 130 is updated with the load and store NSIP information. In this manner, the NSIP comparator 324 detects a next iteration, if any, of the same store instruction and updates the corresponding entry in the AQ 130 by setting true the corresponding STVLD value and further storing the corresponding store ROB index. The NSIP comparator 325 detects the next iteration of the subsequent load instruction (load NSIP match) and asserts the AQ_HIT signal true, and the dependency of the load instruction is updated with the ROB index of the corresponding store instruction to prevent another memory violation.

When the NSIP comparator 325 does not detect a match within the AQ 130, then this means that the subsequent load instruction either does not depend on a prior store instruction, or that it is a first iteration and has not yet been involved in a collision with a store instruction. If the subsequent load instruction does, in fact, depend on a prior store instruction but the load/store pair have not yet been executed, and if it is then dispatched before that store instruction according to OOO operation, then the memory violation is detected by the memory subsystem 116 and the AQ 130 is updated with the load and store NSIP information. In this manner, the NSIP comparator 325 detects a next iteration of the same load instruction and asserts the AQ_HIT signal true, and the dependency of the load instruction is updated with the ROB index of the corresponding store instruction to prevent another memory violation.

It is noted that the NSIP values (SNSIP, LNSIP) stored in the local memory 319 and/or the AQ 130 may be stored in reduced form. For example, lower bits of the NSIP value forming a page offset may be sufficient in some configurations. In addition or in the alternative, the RAT logic 302 may further includes a hashing function that hashes upper bits of each NSIP value into hashed values that are combined with the lower page offset bits for the store NSIP values. The AQ 130 includes as many entries as desired for detecting multiple store collisions during operation. In one embodiment, each entry of the AQ 130 includes 4 fields for storing the LNSIP and SNSIP values, the SRIDX value, and the corresponding valid value STVLD. In an alternative embodiment as previously described, each entry includes 3 fields in which the SRIDX value is stored in a separate memory location within the RAT 106.

Figure 4:
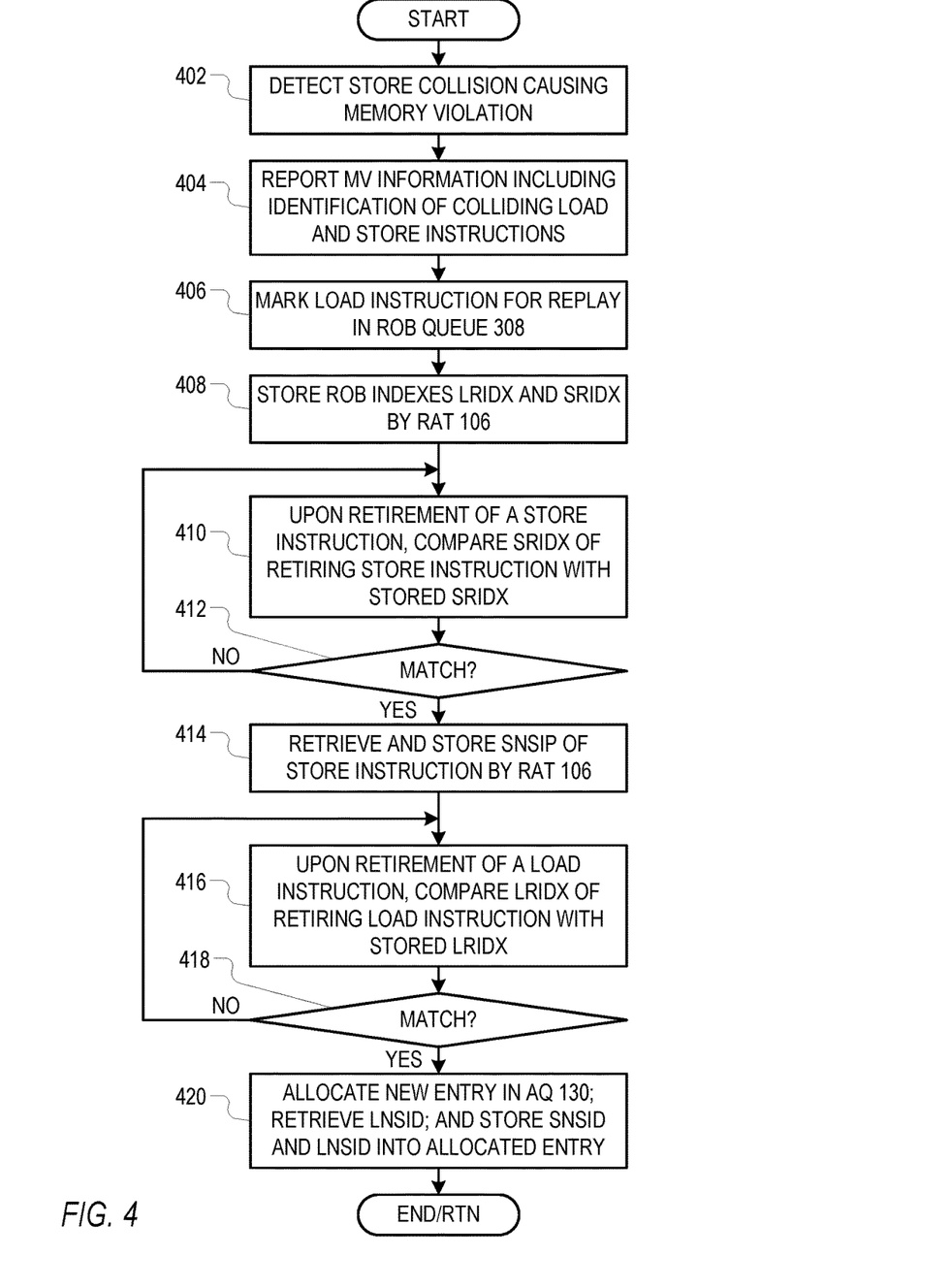
FIG. 4 is a flowchart diagram illustrating a process performed by the processor of FIG. 1 for storing instruction pointers of colliding load and store instructions into an entry of the alias queue of FIG. 1.

FIG. 4 is a flowchart diagram illustrating a process performed by the processor 100 for storing instruction pointers of colliding load and store instructions into an entry of the AQ 130. At a first block 402, a store collision causing a memory violation is detected, such as by the memory subsystem 116. At next block 404, the MV information of the memory violation is reported, such as by the memory subsystem 116, in which the MV information identifies the colliding load and store instructions. The MV information may include, for example, the corresponding NSIP values LNSIP and SNSIP, or the corresponding ROB indexes LRIDX and SRIDX. At next block 406, the load instruction is marked for replay in the ROB queue 308, such as by setting the replay value RPLY in the corresponding ROB queue entry. At next block 408, the RAT 106 stores the ROB indexes LRIDX and SRIDX of the colliding LD/ST instruction pair. In one embodiment, the ROB indexes LRIDX and SRIDX are stored in the local memory 319.

Upon retirement of each store instruction at block 410, the SRIDX of the retiring store instruction is compared with the SRIDX stored by the RAT 106. If the SRIDX values do not match as determined at next query block 412, then operation returns to block 410 for the next store instruction to be retired. If the SRIDX values do match as determined at query block 412, then operation proceeds to block 414 in which the RAT 106 retrieves and stores the NSIP value SNSIP of the retiring store instruction, such as within the local memory 319. Upon retirement of each load instruction at block 416, the LRIDX of the retiring load instruction is compared with the LRIDX stored by the RAT 106. If the LRIDX values do not match as determined at next query block 418, then operation returns to block 416 for the next load instruction to be retired. If the LRIDX values do match as determined at query block 418, then the load instruction is actually being replayed and is the load instruction of the stored load/store instruction pair that caused the memory violation, and operation proceeds to next block 420. At block 420, a new entry is allocated within the AQ 130, the LNSID of the load instruction is retrieved from the ROB queue 308 using the LRIDX to locate the load instruction, and then the SNSID value (may be previously stored in the local memory 319) and the retrieved LNSID value of the load/store instruction pair are stored into the allocated entry of the AQ 130. Operation is completed at least for one load/store instruction pair and may be repeated for subsequent memory violations cause by store collisions.

Figure 5:
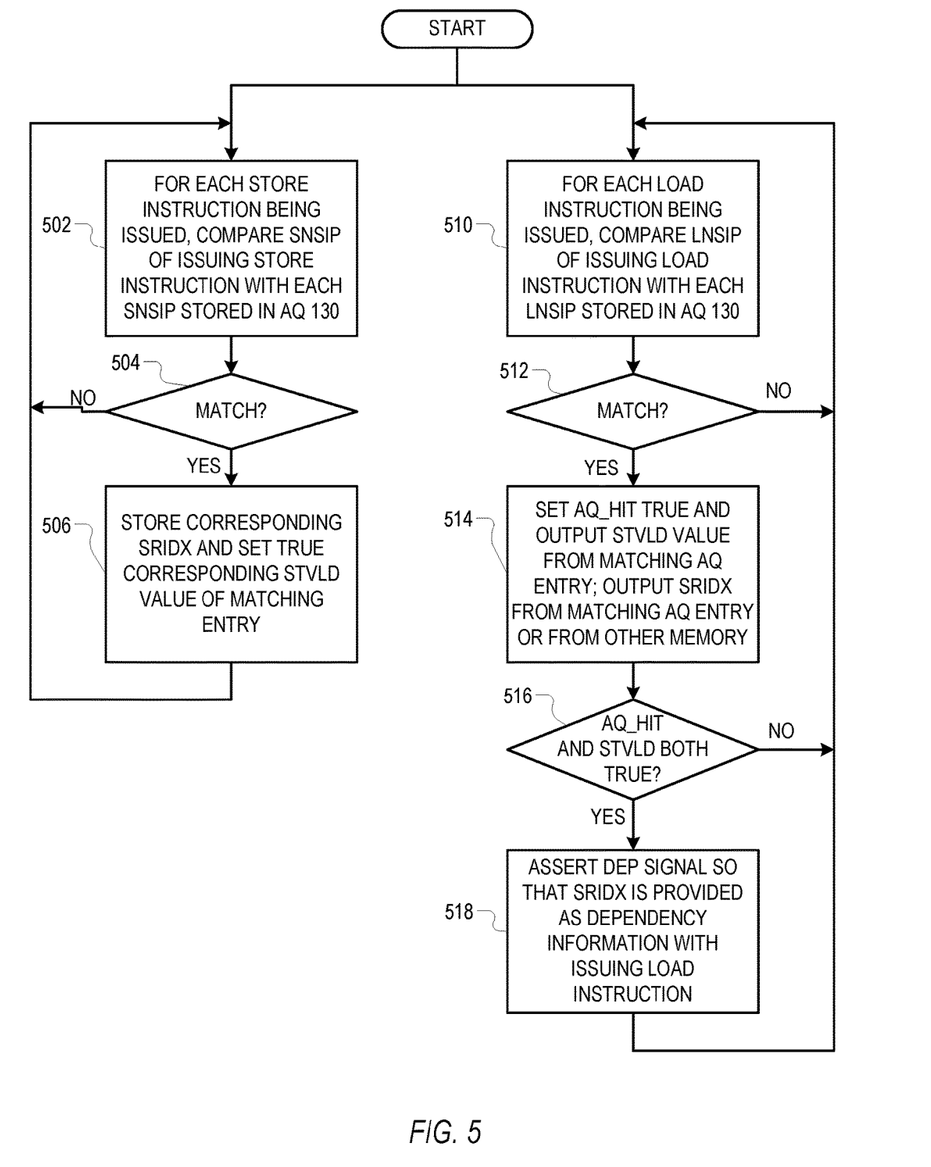
FIG. 5 is a flowchart diagram illustrating a process performed by the register alias table of the processor of FIG. 1 for detecting subsequent store collisions of subsequent executions of the same load/store colliding instruction pair stored in an entry of the alias queue of FIG. 1.

FIG. 5 is a flowchart diagram illustrating a process performed by the RAT 106 of the processor 100 for detecting subsequent store collisions of subsequent executions of the same load/store colliding instruction pair stored in an entry of the AQ 130. At a first block 502, for each store instruction being issued by the RAT 106, the ROB index SNSIP of the issuing store instruction is compared with each SNSIP stored within the AQ 130. If the SNSIP values do not match as determined at query block 504, then operation returns to block 502 for the next store instruction. Operation loops until a match is detected. When the SNSIP values do match as determined at query block 504, then operation proceeds instead to block 506 in which the corresponding SRIDX of the issuing store instruction is stored, and the corresponding STVLD value of the matching entry is set true. As previously described, SRIDX may be stored into the AQ 130 entry, or it may be stored in another memory location of the RAT 106. Operation then returns to block 502 for the next issuing store instruction. Operation repeats during operation of the processor 100.

Meanwhile at another block 510, for each load instruction being issued by the RAT 106, the ROB index LNSIP of the issuing load instruction is compared with each LNSIP stored within the AQ 130. If the LNSIP values do not match as determined at query block 512, then operation returns to block 510 for the next load instruction. Operation loops until a match is detected. When the LNSIP values do match as determined at query block 512, then operation proceeds instead to block 514 in which AQ_HIT is set true and the STVLD value of the matching AQ entry is output or otherwise provided. The SRIDX value is also output from the matching AQ entry or from other memory location. At next block query 516, if AQ_HIT and STVLD are both true, such as determined by the AND gate 326, then operation proceeds to block 518 in which the DEP signal is asserted. In response to the DEP signal, the SRIDX is provided as dependency information with the subsequently issuing load instruction. For example, the SRIDX may be provided within a field of the subsequently issuing load instruction so that the subsequently issuing load instruction will not be dispatched by the dispatcher 108 before the store instruction identified by SRIDX in the ROB queue 308. In this manner, subsequent memory violations and corresponding load replays are avoided. Operation then returns to block 510 for the next issuing load instruction. Operation repeats during operation of the processor 100.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A register alias table for a processor, comprising:
   an alias queue comprising at least one entry, wherein each entry stores a load instruction pointer, a store instruction pointer, and a valid value, and wherein said load and store instruction pointers correspond with a pair of load and store instructions that previously collided with each other causing a memory violation;
   a store comparator that compares a store instruction pointer of a subsequent store instruction with each store instruction pointer stored in said alias queue, and when a match is detected, that sets true a corresponding valid value in a corresponding alias queue entry;
   a load comparator that compares a load instruction pointer of a subsequent load instruction with each load instruction pointer stored in said alias queue, and when a match is detected, that sets true an AQ hit with a matching alias queue entry; and dependency logic that provides a store index of said subsequent store instruction as dependency information for said subsequent load instruction if said valid value of said matching alias queue entry and said AQ hit are both true.

2. The register alias table of claim 1, wherein said dependency logic comprises:
compare logic that provides a dependency indication when said valid value of said matching alias queue entry and said AQ hit are both true; and
pass logic that passes said store index of said subsequent store instruction into a dependency field of said subsequent load instruction when said dependency indication is provided.

3. The register alias table of claim 1, further comprising:
a local memory that stores a load index and a store index of said pair of load and store instructions that previously collided with each other causing said memory violation; and
RAT logic that compares a subsequent store index of a retiring store instruction with said store index stored in said local memory, and that retrieves and stores said store instruction pointer in the event of a match.

4. The register alias table of claim 3, wherein said RAT logic compares a subsequent load index of a load instruction being replayed with said load index stored in said local memory, and in the event of a match, retrieves said load instruction pointer, allocates an entry in said alias queue, and stores said store instruction pointer and said load instruction pointer into said allocated entry of said alias queue.

5. The register alias table of claim 1, wherein each entry of said alias queue further comprises a store index field, wherein when said store comparator detects that said store instruction pointer of said subsequent store instruction matches any store instruction pointer stored in said alias queue, said store comparator further stores said store index of said subsequent store instruction into said store index field.

6. The register alias table of claim 1, further comprising RAT logic that stores said load and store instruction pointers in said alias queue with a reduced number of bits including lower page offset bits combined with hashed values of upper bits of said instruction load and store pointers.

7. A processor, comprising:
a reorder buffer including a ROB queue comprising a plurality of entries in which each entry stores an instruction pointer of a corresponding instruction issued for execution; and
a register alias table, comprising:
an alias queue comprising at least one entry, wherein each entry stores a load instruction pointer, a store instruction pointer, and a valid value;
RAT logic that receives a memory violation indication caused by a store collision between a prior load instruction and a prior store instruction, wherein said RAT logic retrieves from said ROB queue a store instruction pointer of said prior store instruction and a load instruction pointer of said prior load instruction and stores said store instruction pointer and said load instruction pointer into an entry of said alias queue;
a store comparator that compares a store instruction pointer of a subsequent store instruction with each store instruction pointer stored in said alias queue, and that sets true a corresponding valid value in a corresponding alias queue entry when a match is detected with a store instruction pointer in said corresponding alias queue entry;

a load comparator that compares a load instruction pointer of a subsequent load instruction with each load instruction pointer stored in said alias queue, and that sets true an AQ hit when a match is detected with a stored load instruction pointer in said corresponding alias queue entry; and
dependency logic that provides a store index of said subsequent store instruction as dependency information for said subsequent load instruction when said valid value of said matching alias queue entry and said AQ hit are both true.

8. The processor of claim 7, wherein:
said reorder buffer further comprises ROB logic that retires instructions in said ROB queue in program order and that identifies instructions being retired or replayed to said RAT logic; and
wherein said RAT logic retrieves said store instruction pointer of said prior store instruction from said ROB queue upon retirement of said prior store instruction, and retrieves said load instruction pointer of said prior load instruction from said ROB queue upon replay of said prior load instruction.

9. The processor of claim 7, wherein:
said reorder buffer further comprises ROB logic that retires instructions in said ROB queue in program order and that identifies instructions being retired or being replayed to said RAT logic;
wherein said register alias table further comprises a local memory;
wherein in response to said memory violation indication, said RAT logic stores a load ROB index identifying a location of said prior load instruction within said ROB queue into said local memory and stores a store ROB index identifying a location of said prior store instruction within said ROB queue into said local memory;
wherein said RAT logic compares a store ROB index received from said ROB logic with said store ROB index stored in said local memory, and retrieves and stores said store instruction pointer of said prior store instruction from said ROB queue in the event of a match; and
wherein said RAT logic compares a load ROB index received from said ROB logic for a load instruction being replayed with said load ROB index stored in said local memory, and in the event of a match, retrieves said load instruction pointer of said prior load instruction from said ROB queue, allocates an entry in said alias queue, and stores said retrieved load instruction pointer and said store instruction pointer into said allocated entry of said alias queue.

10. The processor of claim 7, further comprising:
a memory subsystem that detects a memory violation caused by a collision between said prior load instruction and said prior store instruction and that provides said memory violation indication identifying said prior load and store instructions;
wherein an entry within said ROB queue corresponding with said prior load instruction is marked with a replay indication; and
wherein said RAT logic stores a store ROB index identifying said prior store instruction and stores a load ROB index identifying said prior load instruction in response to said memory violation indication.

11. The processor of claim 7, wherein said dependency logic comprises:

compare logic that provides a dependency indication when said valid value of said matching alias queue entry and said AQ hit are both true; and pass logic that passes said store index of said subsequent store instruction into a dependency field of said subsequent load instruction when said dependency indication is provided.

12. The processor of claim 7, wherein each entry of said alias queue further comprising a store index field, wherein when said store comparator detects that said store instruction pointer of said subsequent store instruction matches any store instruction pointer stored in said alias queue, said store comparator further stores said store index of said subsequent store instruction into said store index field.

13. A method of predicting load and store dependency to reduce memory violations, comprising:

storing instruction pointers of colliding load and store instructions into an alias queue;

comparing a subsequent store instruction pointer of a subsequent store instruction with each store instruction pointer stored in the alias queue, and when a match is found, indicating that a corresponding store index of the subsequent store instruction is valid; and comparing a subsequent load instruction pointer of a subsequent load instruction with each load instruction pointer stored in the alias queue, and when a match is found and if the corresponding store index of the subsequent store instruction is valid, providing the corresponding store index of the subsequent store instruction as dependency information for the subsequent load instruction.

14. The method of claim 13, further comprising:

receiving a memory violation indication that identifies the colliding load and store instructions;

storing a load index that identifies the colliding load instruction and storing a store index that identifies the colliding store instruction; and when the colliding store instruction retires, retrieving and storing a corresponding store instruction pointer.

15. The method of claim 14, further comprising retrieving and storing a corresponding load instruction pointer upon replay of the colliding load instruction.

16. The method of claim 14, wherein said retrieving and storing a corresponding store instruction pointer comprises retrieving the corresponding store instruction pointer from a ROB queue and storing into a local memory.

17. The method of claim 16, further comprising:

in response to replay of the colliding load instruction, retrieving a corresponding load instruction pointer from the ROB queue; and allocating an entry in the alias queue and storing the retrieved load instruction pointer into the entry of the alias queue and storing the corresponding store instruction pointer stored in the local memory into the entry of the alias queue.

18. The method of claim 17, wherein said indicating that a corresponding store index of the subsequent store instruction is valid comprises storing the corresponding store index into the entry of the alias queue.

19. The method of claim 14, further comprising comparing a store index of a retiring store instruction with the stored store index, and comparing a load index of a load instruction being replayed with the stored load index.

20. The method of claim 13, wherein said storing instruction pointers of the colliding load and store instructions into an alias queue comprises storing reduced forms of the colliding load and store instructions into the alias queue.

* * * * *